United States Patent
Bruno et al.

(10) Patent No.: US 8,798,464 B2
(45) Date of Patent: Aug. 5, 2014

(54) SETTING OPTICAL POWER FOR AN OPTICAL COMMUNICATIONS NETWORK CHANNEL

(75) Inventors: Gianmarco Bruno, Genoa (IT); Riccardo Ceccatelli, San Miniato (IT); Edoardo Mongiardini, Arenzano (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 298 days.

(21) Appl. No.: 13/256,935

(22) PCT Filed: Mar. 19, 2009

(86) PCT No.: PCT/EP2009/053273
§ 371 (c)(1),
(2), (4) Date: Nov. 23, 2011

(87) PCT Pub. No.: WO2010/105687
PCT Pub. Date: Sep. 23, 2010

(65) Prior Publication Data
US 2012/0063775 A1    Mar. 15, 2012

(51) Int. Cl.
*H04B 10/08* (2006.01)
(52) U.S. Cl.
USPC .......... 398/38; 398/33; 398/34; 398/37; 398/79; 398/197; 398/159; 398/160; 398/162; 398/94; 359/337; 359/341; 359/341.3; 359/337.4; 356/73.1
(58) Field of Classification Search
USPC .......... 398/38, 33, 34, 37, 25, 30, 31, 158, 398/159, 160, 79, 83, 177, 180, 181, 92, 93, 398/94, 95, 162, 183, 192, 193, 194, 195, 398/196, 197, 198, 200, 201; 359/337, 341, 359/334, 341.3, 337.4; 356/73.1
See application file for complete search history.

(56) References Cited

U.S. PATENT DOCUMENTS

| 6,871,020 | B1 | 3/2005 | Boroditsky et al. |
| 7,248,799 | B2 * | 7/2007 | Faure et al. ............ 398/38 |
| 2001/0038488 | A1 | 11/2001 | Kinoshita |
| 2009/0016727 | A1 | 1/2009 | Ueki et al. |

FOREIGN PATENT DOCUMENTS

EP    1 164 738 A2    12/2001

OTHER PUBLICATIONS

PCT International Search Report, mailed Jan. 18, 2010, in connection with International Application No. PCT/EP2009/053273.

* cited by examiner

*Primary Examiner* — Hanh Phan
(74) *Attorney, Agent, or Firm* — Leffler Intellectual Property Law, PLLC (57) ABSTRACT

A method of determining a power correction factor for an optical power of an optical channel of a wavelength division multiplexed communications network. The method comprises configuring an optical source of the communications network to generate an unmodulated optical carrier signal for the optical channel. The method further comprises determining the optical power of the unmodulated optical carrier signal ($P_{HIGH}$). The method further comprises configuring the optical source to apply a test modulation pattern to the optical carrier signal, to generate a modulated optical carrier signal. The method further comprises determining the optical power of the modulated optical carrier signal ($P_{MOD}$). The method further comprises determining a power correction factor for the optical channel by determining the difference between the optical powers of the unmodulated optical carrier signal and the modulated optical carrier signal.

12 Claims, 7 Drawing Sheets

SETTING OPTICAL POWER FOR AN OPTICAL COMMUNICATIONS NETWORK CHANNEL

FIELD OF THE INVENTION

The invention relates to a method of determining a power correction factor for an optical power measurement of a channel of a wavelength division multiplexed communications network and to a method of setting the optical power of a channel of a wavelength division multiplexed communications network.

BACKGROUND OF THE INVENTION

In wavelength division multiplexed (WDM) optical communications networks operating at data rates of up to 40 Gb/s, 100 Gb/s or higher, each channel must be launched at a desired optical power level in order to obtain a desired signal quality. This is particularly important for optical communications systems operating at a high spectral efficiency (number of bits per second per unit bandwidth, bit/s/Hz). Channel power setting is made by a Channel Monitoring unit (CMU), as set out in ITU-T Recommendation G.697, that monitors an aggregate WDM data traffic signal.

CMUs typically provide channel power measurements by estimating the spectral power density of an aggregate WDM data traffic signal using a tunable filter and a photodiode. The power measurements are given referred to an equivalent optical spectrum analyzer (OSA) resolution. These channel power measurements are systematically inaccurate due to the spectral resolution of the CMU, and CMU manufacturers provide correction factors for the measurements for a range of data signal rates and modulation formats. Many commercial CMUs cannot meet the ITU-T Recommendation G.697 requirements for channel power measurement accuracy for traffic signals with high data rate and high SE.

In another approach, the WDM traffic signal is demultiplexed and the optical power of each channel is measured using a photodiode. The disadvantage of this approach is that the information about the carrier frequency and the optical signal to noise ratio (OSNR) is lost and the demultiplexer can imperfectly select a channel and insulate the other channels. In U.S. Pat. No. 6,871,020, directed to the minimization of channel crosstalk, a series of optical splitter and wavelength selective filters (fibre Bragg gratings) is used to separate out the WDM channels, for power measurement using photodiodes. This approach would be difficult to scale to the number of channels (80, 96 and more) required in current optical communications networks.

SUMMARY OF THE INVENTION

It is an object to provide an improved method of setting the optical power of a channel of a wavelength division multiplexed communications network. It is a further object to provide an improved method of determining a power correction factor for an optical power measurement of a said channel. It is a further object to provide an improved optical network element. It is a further object to provide an improved channel monitoring unit.

A first aspect of the invention provides a method of determining a power correction factor for an optical power of an optical channel of a wavelength division multiplexed communications network. The method comprises configuring an optical source of the communications network to generate an unmodulated optical carrier signal for the said optical channel. The method further comprises determining the optical power of the said unmodulated optical carrier signal ($P_{HIGH}$). The method further comprises configuring the said optical source to generate a modulated optical carrier signal for the said optical channel. The optical source is configured to apply a test modulation pattern to the optical carrier signal. The method further comprises determining the optical power of the said modulated optical carrier signal ($P_{MOD}$). The method further comprises determining a power correction factor for the said optical channel by determining the difference between the said optical power of the said unmodulated optical carrier signal and the said optical power of the said modulated optical carrier signal.

The method enables a power correction factor to be determined for an actual optical channel within a WDM communications network, rather than simply a power correction factor for a certain data rate and modulation format as measured by a certain channel monitoring unit. The method enables a power correction factor to be determined which is not dependent on modulation format or data bit-rate, since the method measures the optical powers of an unmodulated optical carrier signal and a carrier signal modulated with a test modulation pattern, rather then measuring optical powers of optical carrier signals modulated with live data traffic, as occurs in known methods. The method is also independent of the multiplexing scheme which is used to add an optical channel to the WDM communications network. The method is particularly advantageous for data signals with high spectral efficiency (SE).

In an embodiment, the method comprises configuring the said optical source to generate said unmodulated optical carrier signal to have an optical power ($P_{HIGH}$) substantially equal to an operating optical power at which said optical channel may carry data traffic. Alternatively, the method may comprise configuring the said optical source to generate said unmodulated optical carrier signal to have an optical power ($P_{HIGH}$) less than, for example up to 5 dB less, an operating optical power at which said optical channel may carry data traffic.

The said optical channel may comprise one of a plurality of wavelength division multiplexed optical channels each having an operating optical power. In such a situation, the method comprises initially configuring the said optical source to generate an unmodulated optical carrier signal having a starting optical power ($P_{LOW}$) being lower than the said optical power ($P_{HIGH}$) and then increasing the optical power of the said channel from the starting optical power to the said optical power. For example, the starting optical power may be 15 to 20 dB less than the operating optical powers of the other optical channels in the said plurality. The method may comprise increasing the optical power of the said channel from the starting optical power ($P_{LOW}$) to the said optical power ($P_{HIGH}$) in a substantially linear manner, which in one embodiment comprises ramping the optical power with a ramp slope of 0.1 to 1 dB/millisecond.

A power correction factor may thus be determined for an optical channel without causing any influence on the other optical channels.

In an embodiment, the optical source is configured to apply a test modulation in the form of a bit sequence comprising a substantially equal number of ones and zeros, such as a pseudo-random bit sequence, to the optical carrier signal. The power correction factor (Delta) is determined by the equation:

$$\text{Delta(dB)} = P_{HIGH}(\text{dB}) - P_{MOD}(\text{dB}) - 3 \text{ dB}$$

Using a test modulation enables the actual optical power of the modulation optical carrier signal to be accurately determined.

In an embodiment, the method further comprises storing the power correction factor. The method may alternatively or additionally comprise generating a control signal arranged to transmit the power correction factor to one or more locations within the communications network.

A second aspect of the invention provides a method of controlling an optical power of one or more optical channels of a wavelength division multiplexed communications network. The method comprises obtaining a power correction factor for a said optical channel and generating a control signal for transmitting the said power correction factor to an optical power regulation device of the said network. The said optical power regulation device is operable to control the optical power of the said optical channel. At the said optical power regulation device, the method further comprises obtaining a desired optical power value for the said optical channel. The method further comprises determining an operational power value for the said optical power regulation device to regulate the optical power of said optical channel to. The operational power value is equal to the desired optical power value plus the power correction factor.

The method enables the optical power of an optical channel to be set before data transmission starts and is particularly advantageous for WDM communications networks characterised by high spectral efficiency (SE). The method enables the per-channel power of a WDM communications network to be accurately set, thereby maximizing the all-optical connection length of the network, that is the distance between repeater, levelling or amplifier nodes. As a result, the number of optical to electrical to optical (OEO) conversions within the WDM network can be decreased, with a corresponding decrease in network cost.

In an embodiment the method comprises obtaining a power correction factor for each of a plurality of said optical channels and generating a control signal for transmitting the said power correction factors to an optical power regulation device of the said network operable to control the optical power of a said optical channel. In an embodiment the said power correction factors are provided within a data structure, such as a table, comprising a plurality of cells, each cell being associated with a said one of the said optical channels. The said power correction factor for a said optical channel is provided within the said associated cell.

In an embodiment of the invention, the method comprises transmitting the said control signal to the or each optical power regulation device in an optical link of the said network along which one or more of said optical channels are to be routed. The method may comprise transmitting the said control signal to a said optical power regulation device in the form of an optical transmitter, which may be at a launch terminal of the said network or at an add/drop node of the said network, or a signal power levelling node.

In an embodiment, the method comprises transmitting the said control signal to each of a plurality of said optical power regulation devices serially along the said optical link. The said control signal may be transmitted serially by each of said optical power regulation devices receiving the said control signal and subsequently retransmitting the said control signal to a following one of said optical power regulation devices. The method may comprise transmitting the said control signal on an optical supervisory channel of the said network.

In an embodiment, where there is no optical signal present for a said optical channel at a said optical power regulation device the method comprising setting the said cell associated with the said channel to have no value provided therein or to have a default value, which may be zero, provided therein. In an embodiment, when a new optical signal is provided for a said optical channel the method comprises obtaining a new power correction factor for the said new optical signal and providing the said cell associated with the said channel with said new power correction factor and generating an updating control signal for transmitting the said new power correction factor to the or each optical power regulation device of the said network operable to control the optical power of the said optical channel. The updating control signal may comprise the said new power correction factor or may comprise the said table comprising the said new power correction factor.

In an embodiment, the method further comprises measuring the optical power of a said optical channel at a location downstream of a said optical power regulation device and comparing the said measured optical power to the said operational power value. The method may further comprise reducing the said operational power value to be compared to the said measured optical power to take into account attenuation of the said optical channel between the said optical power regulation device and said location.

The power correction factor may be obtained using any of the above steps of the method of determining a power correction factor for an optical power of an optical channel of a wavelength division multiplexed communications network.

A third aspect of the invention provides a network element of a wavelength division multiplexed communications network. The network element comprises an optical source, optical power measurement apparatus and control apparatus. The optical source is operable to generate an optical carrier signal for an optical channel. The optical power measurement apparatus is arranged to receive a portion of the said optical carrier signal and to determine the optical power of the said optical signal. The control apparatus is operable to configure the said optical source, to receive an optical power measurement from the said optical signal power measurement apparatus and to determine a power correction factor for the said optical channel. The control apparatus is operable in a first instance to configure the said optical source to generate an unmodulated optical carrier signal and to receive an optical power measurement ($P_{HIGH}$) of the said unmodulated optical carrier signal from the said optical signal power measurement apparatus. The control apparatus is operable in a second instance to configure the said optical source to apply a test modulation pattern to the optical carrier signal, to thereby form a modulated optical carrier signal and to receive an optical power measurement ($P_{MOD}$) of the said modulated optical carrier signal from the said optical signal power measurement apparatus. The control apparatus is operable to determine a power correction factor for the said optical channel by determining the difference between the said optical power of the said unmodulated optical carrier signal and the said optical power of the said modulated optical carrier signal.

The network element is able to determine a power correction factor for an actual optical channel within a WDM communications network, rather than simply a power correction factor for a certain data rate and modulation format. The network element is able to determine a power correction factor which is not dependent on modulation format or data bit-rate, since the network element measures the optical powers of an unmodulated optical carrier signal and a carrier signal modulated with a test modulation pattern, rather than measuring optical powers of optical carrier signals modulated with live data traffic, as in the prior art. The network element is able to determine a power correction factor that is also independent of the multiplexing scheme which is used to add an optical channel to the WDM communications network. The network element is particularly advantageous for use with data signals with high spectral efficiency (SE).

In an embodiment, the said control apparatus is further operable to obtain a desired optical power value for the said optical channel and to determine an operational power value for the said optical channel equal to the desired optical power value plus the power correction factor, and to configure the said optical source to generate an optical carrier signal having an optical power substantially equal to the said operational power value.

A fourth aspect of the invention provides a channel monitoring unit for a wavelength division multiplexed communications network. The channel monitoring unit comprises optical power measurement apparatus and a processor unit. The optical power measurement apparatus is arranged to receive a portion of an optical carrier signal from an optical source of an optical channel of the said network and to determine the optical power of the said optical carrier signal. The processor unit is operable to:

i. receive from the said optical signal power measurement apparatus an optical power measurement ($P_{HIGH}$) of an unmodulated optical carrier signal received from the said optical source;

ii. receive from the said optical signal power measurement apparatus an optical power measurement ($P_{MOD}$) for a modulated optical carrier signal received from the said optical source; and iii. determine a power correction factor for the said optical channel by determining the difference between the said received optical power of the said unmodulated optical carrier signal and the said received optical power of the said modulated optical carrier signal.

In an embodiment, the processor unit is further operable prior to step i. to generate a first control signal arranged to cause the said optical source generate an unmodulated optical carrier signal. In an embodiment, the processor unit is further operable prior to step ii. to generate a second control signal arranged to cause the said optical source to apply a test modulation pattern to the optical carrier signal, to thereby form a modulated optical carrier signal.

A fifth aspect of the invention provides an optical power regulation device for a wavelength division multiplexed communications network, the device comprising:

optical power regulation apparatus operable to control the optical power of a received optical carrier signal of an optical channel of the said network; and an optical power controller configured to:

receive a power correction factor for a said optical channel;

obtain a desired optical power value for the said optical channel;

determine an operational power value for the said optical power regulation device to regulate the optical power of said optical channel to, the operational power value being equal to the desired optical power value plus the power correction factor; and generate and transmit a control signal to the said optical power regulation apparatus arranged to cause the said optical power regulation apparatus to set the optical power of the said optical carrier signal to the said operational power value.

The optical power regulation device may comprise one of an amplifier node and a levelling node.

A sixth aspect of the invention provides a data carrier having computer readable instructions embodied therein for providing access to resources available on a computer. The computer readable instructions comprise instructions to cause the computer to perform any of the above steps of the method of determining a power correction factor for an optical power of an optical channel of a wavelength division multiplexed communications network.

A seventh aspect of the invention provides a data carrier having computer readable instructions embodied therein for providing access to resources available on a computer. The computer readable instructions comprise instructions to cause the computer to perform any of the above steps of the method of controlling an optical power of one or more optical channels of a wavelength division multiplexed communications network.

Embodiments of the invention will now be described by way of example only, with reference to the accompanying drawings, in which:

DESCRIPTION OF EMBODIMENTS OF THE INVENTION

Figure 1:
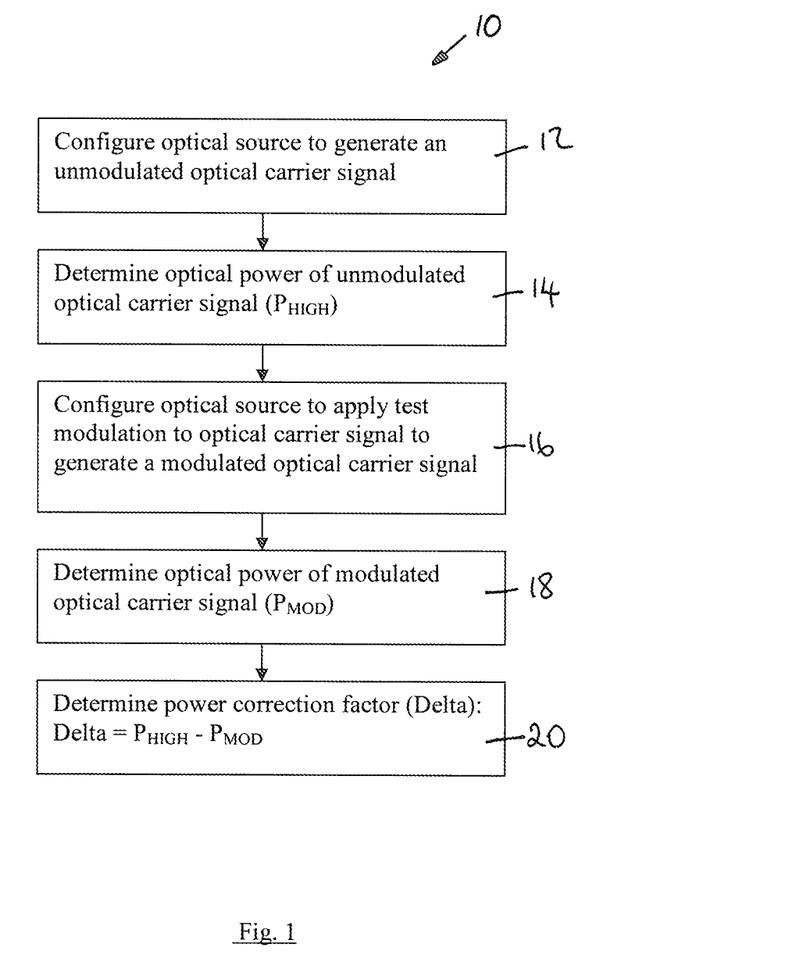
FIG. 1 is a flow diagram of a method of determining a power correction factor for an optical power of an optical channel of a wavelength division multiplexed communications network according to a first embodiment of the invention.

Referring to FIG. 1, the first embodiment of the invention provides a method 10 of determining a power correction factor for an optical power of an optical channel of a wavelength division multiplexed (WDM) communications network.

The method 10 comprises:

Configuring an optical source of the communications network to generate an unmodulated optical carrier signal 12;

Determining the optical power ($P_{HIGH}$) of the unmodulated optical carrier signal 14; Configuring the optical source to apply a test modulation pattern to the optical carrier signal, to thereby generate a modulated optical carrier signal 16;

Determining the optical power ($P_{MOD}$) of the modulated optical carrier signal;

Determining a power collection factor (Delta) for the optical channel by determining the difference between the optical power of the unmodulated optical carrier signal and the optical power of the modulated optical carrier signal 20.

In this example, $P_{HIGH}$ may be of substantially the same optical power that the optical channel will carry data traffic at, or it may be 0-5 dB below this value.

The test modulation pattern comprises a pseudo-random bit sequence (PRBS), which, as will be well know to the person skilled in the art, comprises a substantially equal number of ones and zeros. The power correction factor (Delta) for this type of test modulation pattern is more accurately given by the equation:

$$\text{Delta} = P_{HIGH} - P_{MOD} - 3 \text{ dB}$$

where the 3 dB takes account of the fact that when the optical source is modulated, the actual optical power is halved, in the hypothesis usually applied to PRBS that the ones and zeros are equally likely to occur.

Figure 2:
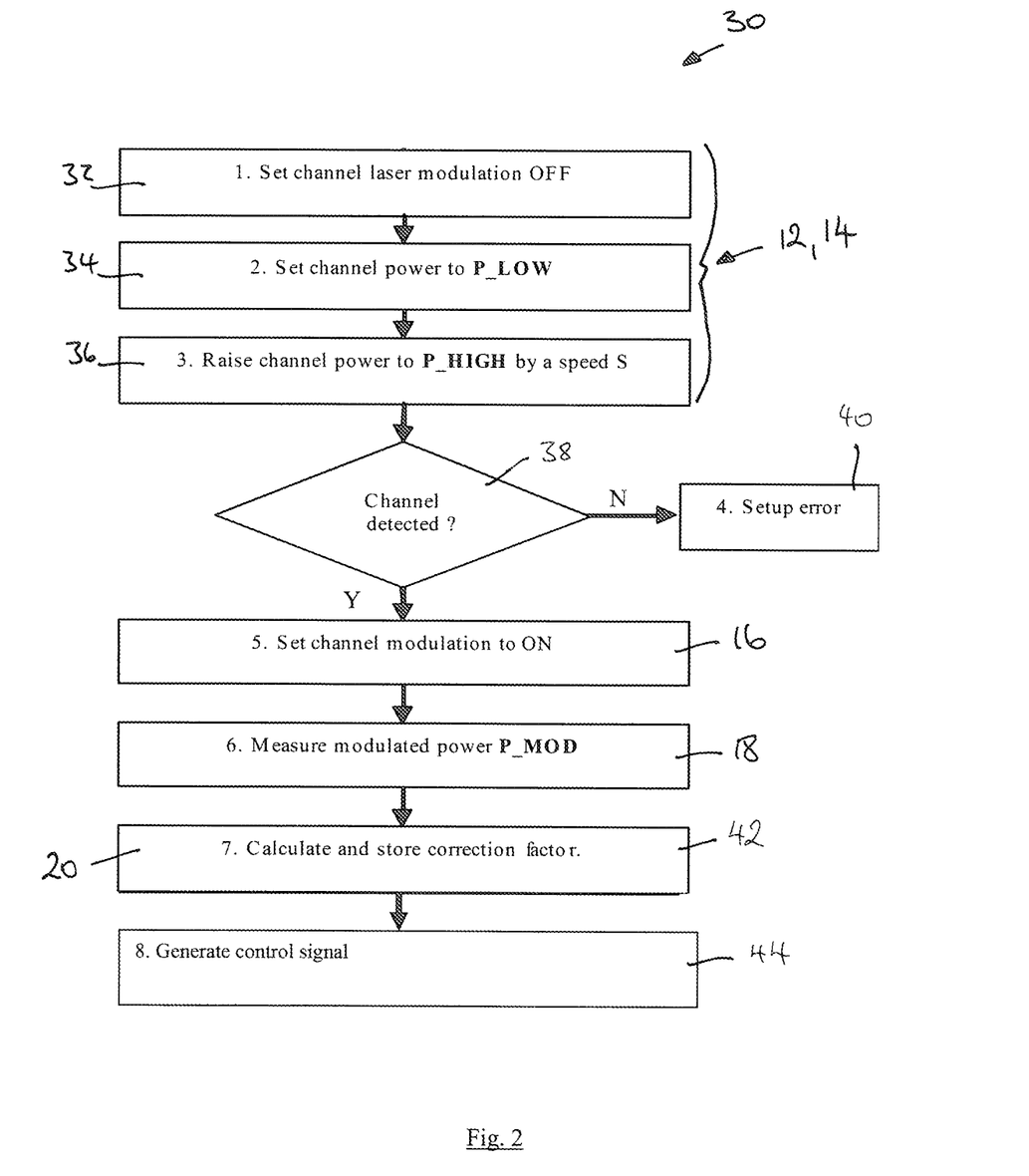
FIG. 2 is a flow diagram of further steps of the method of FIG. 1.

FIG. 2 shows further steps of the method of FIG. 1 for the situation where a power correction factor is to be determined for an optical channel which comprises one of a plurality of WDM optical channels. In this example, the power correction factor is to be determined for the optical channel prior to adding the optical channel to a WDM communications network.

Prior to adding the new channel, the transmitter modulator of the optical source (channel laser) is switched off 32 so that the optical source generates an unmodulated optical carrier signal. The optical power of the optical carrier signal of the channel is set to a starting optical power ($P_{LOW}$) 34 which is typically 15-20 dB below the optical power of the other optical channels. This is so that the channel to be added does not cause any influence on the existing channels during the process of determining its power correction factor, but the optical power of the channel must be high enough in order to be detected. The value selected for $P_{LOW}$ will depend mainly upon the properties of the multiplexing scheme used to add the optical channel to the WDM network, i.e. on channel isolation between the optical channel to be added and the existing channels.

The optical power of the unmodulated optical carrier signal is then increased 36 to $P_{HIGH}$. The optical power is ramped up with a slope S of 0.1-1 dB/ms. The ramp slope S is system dependant and can be limited by any variable attenuators present within the optical source and/or in the multiplexing system.

Since the optical carrier signal is an unmodulated optical signal, any non-linear penalties related to the variations in the optical power caused by the ramping of the optical power are negligible.

In this example, the optical power of the optical carrier signal is measured by a conventional channel monitoring unit (CMU). Once the optical power of the optical channel has been increased to $P_{HIGH}$ a check is made 38 to determine whether the optical channel has been detected by the CMU. If the channel is not detected a set up error 40 is generated and the method must be recommenced from the start, checking and varying the values of $P_{LOW}$, $P_{HIGH}$ and S. The CMU detects the optical carrier signal ad measures its optical power.

The optical source is then configured to apply test modulation 16, by turning the transmitter modulator of the optical source on, to apply the PRBS test modulation pattern.

The optical power ($P_{MOD}$) of the modulated optical carrier signal is then measured 18 by the CMU, and the Delta value is calculated as described above and stored for future use 42. A control signal is generated 44 for transmitting the power correction factor to one or more network locations such as leveling roads.

The power correction factor (Delta) is a characteristic of the optical source and is transmitted to all of the leveling nodes within the communications network which are traversed by optical signals generated by this optical source.

Figure 3:
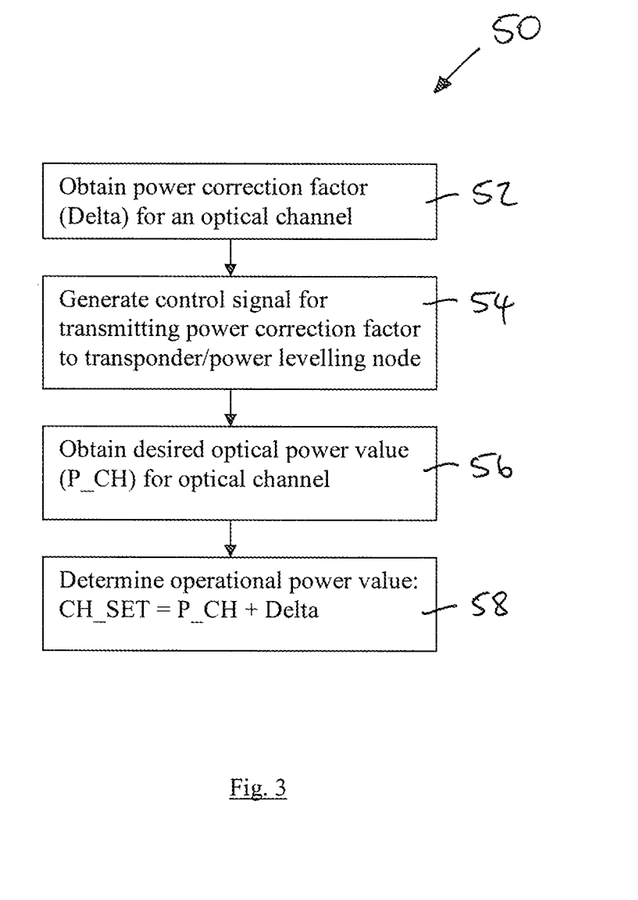
FIG. 3 is a flow diagram of a method of controlling an optical power of one or more optical channels of a wavelength division multiplexed communications network according to a second embodiment of the invention.

Referring to FIG. 3, a second embodiment of the invention provides a method 50 of controlling an optical power of one or more optical channels of a WDM communications network.

The method 50 comprises:
Obtaining a power correction factor (Delta) for an optical channel 52;
Generating a control signal for transmitting the power correction factor to a transponder/power leveling node 54;
Obtaining a desired optical power value ($P_{CH}$) for the optical channel 56;
Determining an operational power value ($CH_{SET}$) equal to the desired optical power value ($P_{CH}$) plus Delta:

$$CH_{SET} = P_{CH} + \text{Delta}$$

In this example, the power correction factor (Delta) is obtained using the method 10 of the first embodiment.

Figure 4:
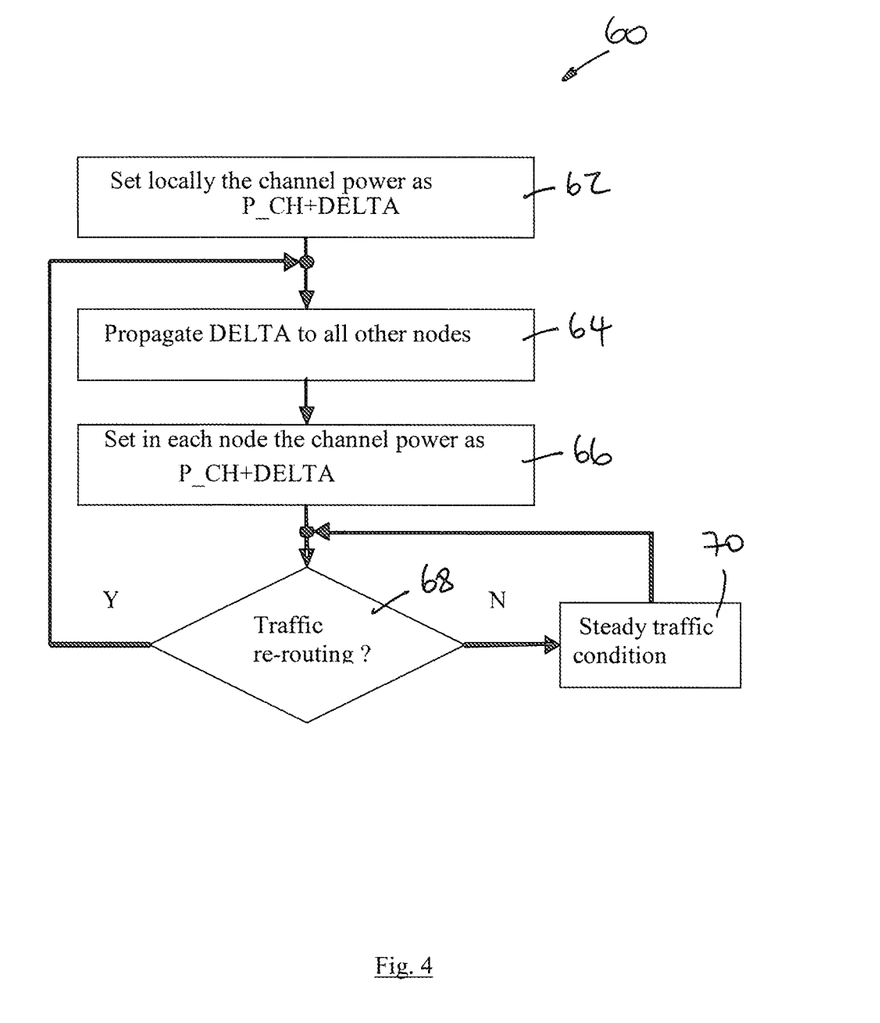
FIG. 4 is a flow diagram of further steps of the method of FIG. 3.

FIG. 4 provides further steps 60 of the method of FIG. 3 in a situation where the channel power is being set for one optical channel in a WDM communications network.

Once the power correction factor (Delta) is known, the optical power of an optical channel can be set correctly at each point along an optical link at which the power-channel optical power has to be regulated, such as at a launch terminal, leveling node or add/drop node along the optical path of the optical signal. In this example, the optical power of the optical channel is set at an add/drop node at which the channel is added to the WDM network.

In this example, the optical power of the optical channel is set at an add/drop node by controlling the optical power of the optical source (transponder) generating the optical signal. The optical signal of the optical channel will propagate through various other nodes within the communications network and the method comprises propagating the power correction value to each of the other nodes 64 which will be traversed by the optical signal. At each of the subsequent nodes, the optical power of the optical carrier signal is set to the operational power value 66.

The optical power of the optical signal is set at the desired optical power level ($CH_{SET}$), which is the desired optical power for the channel ($P_{CH}$), plus the power correction factor (Delta), given by the equation:

$$CH_{SET} = P_{CH} + \text{Delta}$$

The method in this example further comprises measuring the actual optical power of the optical signal after the add/drop node, to check that it meets the desired optical power value. The desired optical power value ($CH_{SET}$) is scaled to take account of signal attenuation between the point where the optical channel is added to the network and the point where the optical power is measured.

In the WDM communications network, power correction factors (Delta) are determined for each optical channel and each Delta value is propagated along the optical link, so that at each node where power regulation is performed, the power correction factor associated with each optical channel is known. The power correction factors are transmitted via the optical supervisory channel, where the DWDM associated overhead is usually conveyed. At each node along the optical link, the power correction factors are stored and then forwarded to the next node along the link, following the optical signal routing path.

Once the power correction factors (Delta) have been transmitted to each of the nodes which the optical channels propagate through, the optical paths comprising those nodes can operate in a steady traffic condition 70, and the power correction factors remain constant during this operating condition.

If an optical channel is rerouted, then the power correction factor must be propagated to each of the nodes within the new optical path. If the wavelength of an optical channel is changed, by switching to a different optical source, the power correction factor for that channel must be recalculated and re-propagated to the relevant nodes.

Figure 5:
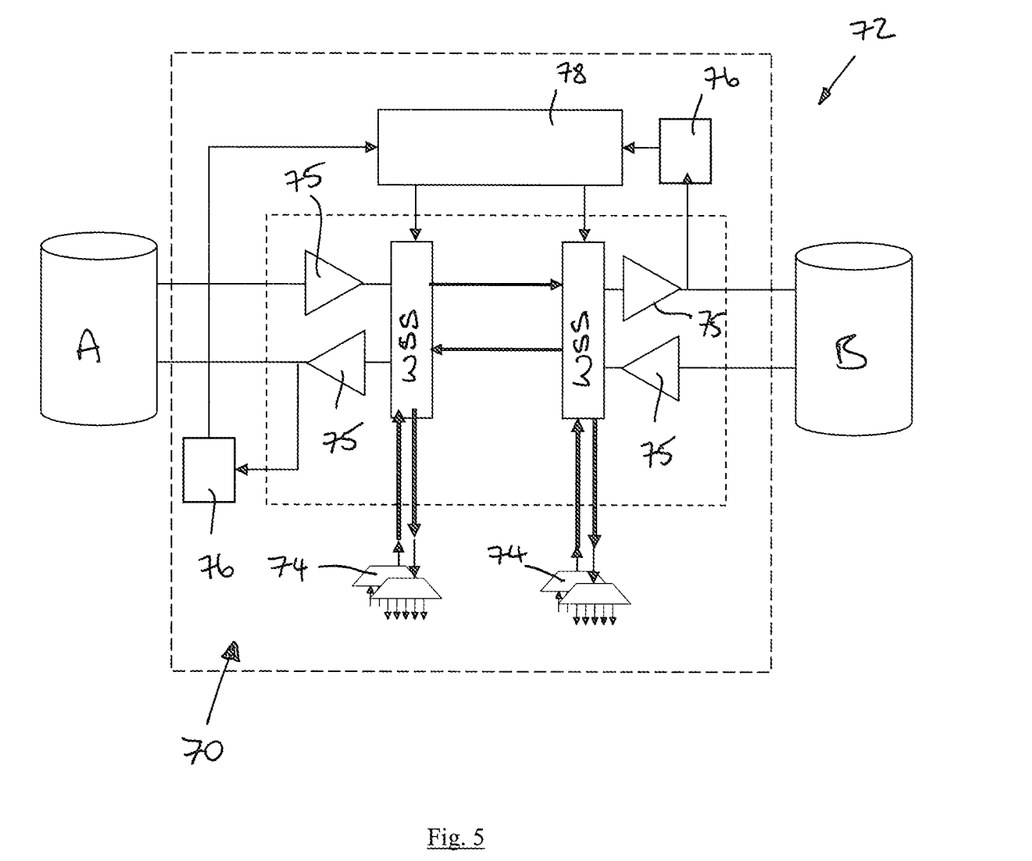
FIG. 5 is a diagrammatic representation of an add/drop node according to a third embodiment of the invention.

A third embodiment of the invention provides a network element of a WDM communications network, which in this example takes the form of an add/drop node 70, as shown in FIG. 5. The add/drop node 70 comprises an optical source 74, optical power measurement apparatus 76, and control apparatus 78.

An optical channel to be added comprises an optical carrier signal generated by the optical source 74, which is coupled into the communications network 72 via a wavelength selective switch (WSS). The optical power measurement apparatus in this example comprises a channel monitoring unit (CMU) 76, which is located downstream of the location at which the optical channel is added; in this example, downstream of the WSS and an optical amplifier 75.

The CMU 76 is arranged to receive a portion of the optical carrier signal and to determine the optical power of the optical carrier signal. The optical power measurement is transmitted from the CMU 76 to the control apparatus 78.

The control apparatus 78 is operable to generate a control signal to cause the optical source to generate an unmodulated optical carrier signal, and to subsequently receive an optical power measurement of the unmodulated optical carrier signal from the CMU 76. The control apparatus 78 is further operable to generate a second control signal arranged to cause the optical source to apply a test modulation pattern, which is this example comprises a PRBS, to the optical carrier signal, to form a modulated optical carrier signal. The control apparatus is further operable to receive an optical power measurement for the modulated optical carrier signal from the CMU 76. The control apparatus 78 is further operable to determine a power correction factor (Delta) for the optical channel, as described above.

It would be appreciated by the person skilled in the art that the WDM communications network 72 shown in the drawing is merely a simplified representation comprising terminals A and B with add/drop node 70 provided therebetween.

Figure 6:
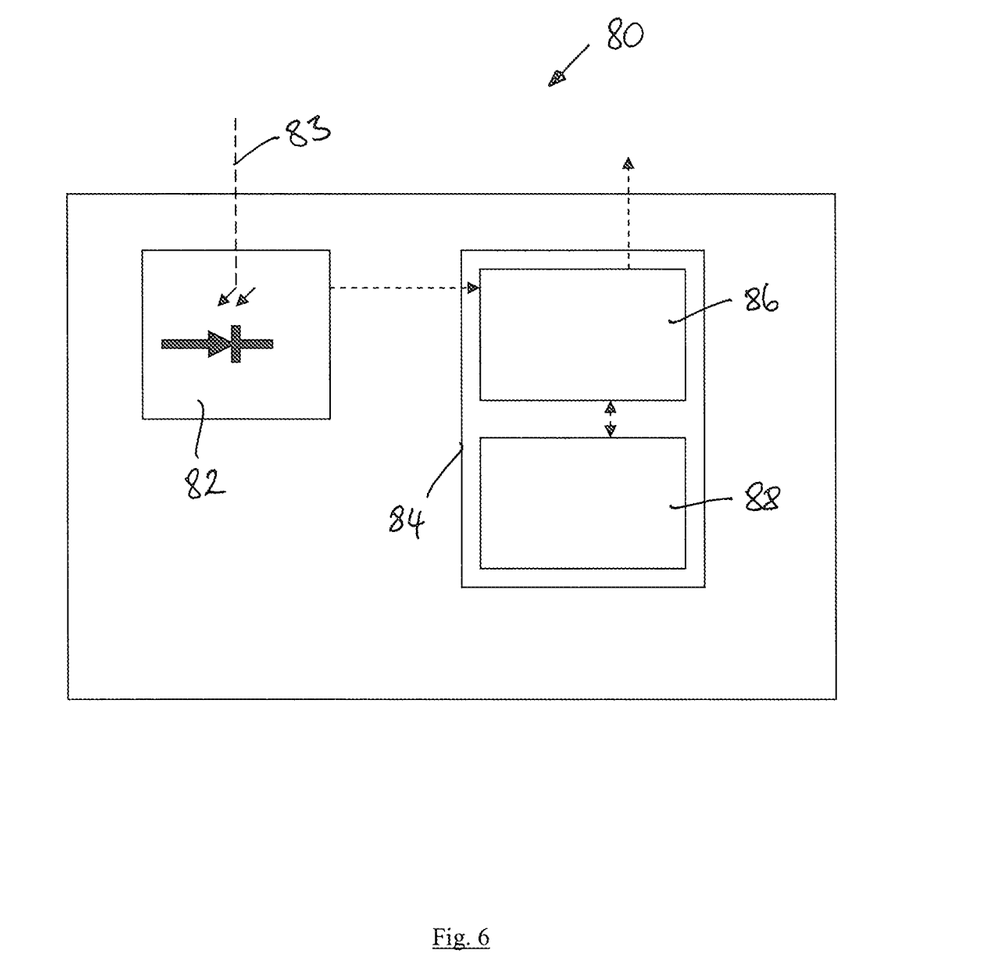
FIG. 6 is a diagrammatic representation of a channel monitoring unit according to a fourth embodiment of the invention.

A fourth embodiment of the invention provides a channel monitoring unit (CMU) 80 for a WDM communications network, as shown in FIG. 6. The CMU 80 comprises optical power measurement apparatus in the form of a photodetector 82 and a processor unit 84.

The photo detector 82 is arranged to receive a portion of an optical carrier signal 83 and, from the received portion, to determine the optical power of the optical carrier signal.

The processor unit 84 comprises a microprocessor 86 and electronic memory 88. It will appreciated that the microprocessor may take any form of processor device, and may be provided within a computer.

The microprocessor 86 is operable to receive optical power measurements from the photodetector 82, and specifically to receive an optical power measurement ($P_{HIGH}$) of an unmodulated optical carrier signal and to receive an optical power measurement ($P_{MOD}$) of a modulated optical carrier signal. Control of the optical carrier signal modulation is carried out externally to the CMU 80.

The optical power measurements may be stored within the memory 88. The microprocessor is further operable to determine a power correction factor (Delta) by applying the equation:

$$\text{Delta} = P_{HIGH} - P_{MOD} - 3 \text{ dB}$$

where the modulated optical carrier signal is modulated with a PRBS test modulation pattern.

In this example, the microprocessor 86 is operable to generate a first control signal to cause the optical source from which the optical signal is received to generate an unmodulated optical carrier signal and is further operable to generate a second control signal to cause the optical source to apply a PRBS test modulation pattern, to form the modulated optical carrier signal. It will be appreciated that the control of the optical carrier signal modulation may alternatively be implemented externally to the CMU 80, and may be implemented manually.

Figure 7:
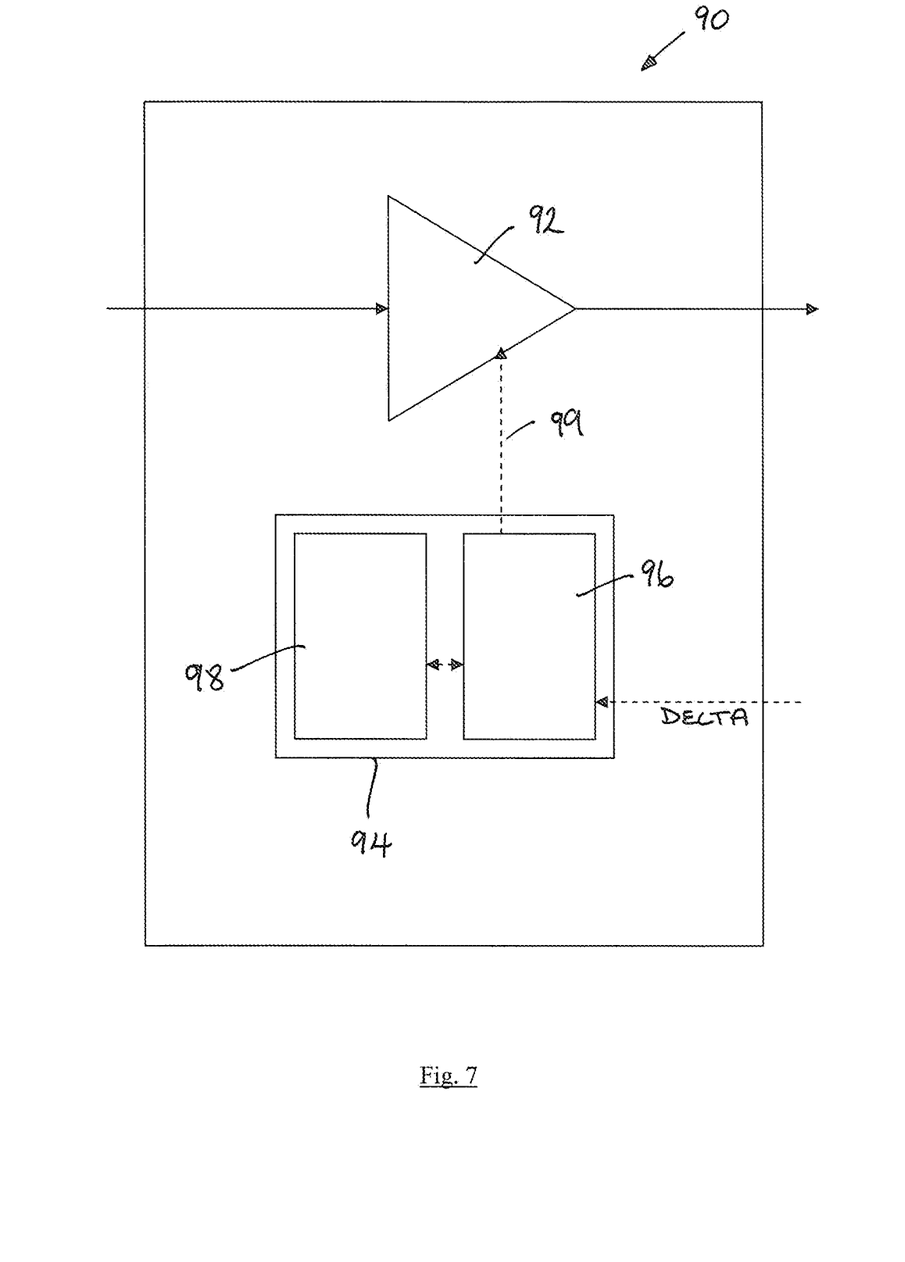
FIG. 7 is a diagrammatic representation of an optical power regulation device according to a fifth embodiment of the invention.

FIG. 7 shows an optical power regulating device, in the form of a leveling node 90, according to a fifth embodiment of the invention. The leveling node 90 comprises optical power regulation apparatus in the form of an optical amplifier 92 and an optical power controller 94.

The optical amplifier 92 is arranged to receive an optical carrier signal of an optical channel of a WDM communications network. The optical amplifier 92 is operable to control the optical power of a received optical carrier signal.

The optical power controller 94 comprises a processor, which may take the form of a microprocessor or a computer, and an electronic memory 98. The processor 96 is configured to receive a power correction factor (Delta) for the received optical channel and to obtain a desired optical power value for the optical channel, which is stored in the memory 98. The processor 96 is operable to determine an operational power value, ($P_{CH}$) according to the equation:

$$CH_{SET} = P_{CH} + \text{Delta}$$

The processor 96 is operable to generate and transmit a control signal 99 to the optical amplifier 92, to cause the optical amplifier 98 to set the optical power of the optical carrier signal to the operational power value ($CH_{SET}$).

A further embodiment of the invention provides a data carrier having computer readable instructions embodied therein for providing access to resources available on a processor, the computer readable instructions comprising instructions to cause the processor to perform the steps of the method of determining a power correction factor according to the first embodiment. The data carrier may take the form of an electronic storage device, such as a computer diskette, compact disc or digital versatile disc, USB memory stick or other electronic memory device. The data carrier may alternatively comprise a communications signal, which may be an electronic signal or an optical signal, such as that used to download information from the internet. The processor may comprise a microprocessor, such as that provided within an optical network node or other network element, or may comprise a computer processor.

A further embodiment of the invention provides a data carrier having computer readable instructions embodied therein for providing access to resources available on the processor, the computer readable instructions comprising instructions to cause the processor to perform the steps of the method of controlling an optical power on one or more optical channels as described in the second embodiment above.

The invention claimed is:

1. A method of determining a power correction factor for an optical power of an optical channel of a wavelength division multiplexed communications network, the method comprising:

configuring an optical source of the communications network to generate an unmodulated optical carrier signal for the optical channel;

determining the optical power of the unmodulated optical carrier signal $P_{HIGH}$;

configuring the optical source to apply a test modulation pattern to the optical carrier signal to thereby generate a modulated optical carrier signal for the optical channel;

determining the optical power of the modulated optical carrier signal $P_{MOD}$; and determining a power correction factor for the optical channel by determining the difference between the optical power of the unmodulated optical carrier signal and the optical power of the modulated optical carrier signal.

2. The method of determining a power correction factor as claimed in claim 1, comprising configuring the optical source to generate the unmodulated optical carrier signal to have an optical power $P_{HIGH}$ substantially equal to or less than an operating optical power at which the optical channel may carry data traffic.

3. The method of determining a power correction factor as claimed in claim 2, wherein where the optical channel comprises one of a plurality of wavelength division multiplexed optical channels each having an operating optical power, the method comprises initially configuring the optical source to generate an unmodulated optical carrier signal having a starting optical power being lower than the optical power $P_{HIGH}$ and then increasing the optical power of the channel from the starting optical power to the optical power.

4. The method of determining a power correction factor as claimed in claim 1, wherein the optical source is configured to apply a test modulation in the form of a bit sequence comprising a substantially equal number of ones and zeros to the optical carrier signal and the power correction factor Delta is determined by the equation:

$$\text{Delta(dB)}=P_{HIGH}(\text{dB})-P_{MOD}(\text{dB})-3\text{ dB}.$$

5. The method of determining a power correction factor as claimed in claim 1, comprising generating a control signal arranged to transmit the power correction factor to one or more locations within the communications network.

6. A method of controlling an optical power of one or more optical channels of a wavelength division multiplexed communications network, the method comprising:

obtaining a power correction factor for a said optical channel;

generating a control signal for transmitting the power correction factor to an optical power regulation device of the network operable to control the optical power of said optical channel; and at the optical power regulation device, obtaining a desired optical power value for the optical channel, and determining an operational power value for the optical power regulation device to regulate the optical power of said optical channel to, the operational power value being equal to the desired optical power value plus the power correction factor, wherein the power correction factor is obtained using a power correction factor method of determining a power correction factor for an optical power of an optical channel of a wavelength division multiplexed communications network, the power correction factor method comprising:

configuring an optical source of the communications network to generate an unmodulated optical carrier signal for the optical channel;

determining the optical power of the unmodulated optical carrier signal $P_{HIGH}$;

configuring the optical source to apply a test modulation pattern to the optical carrier signal to thereby generate a modulated optical carrier signal for the optical channel;

determining the optical power of the modulated optical carrier signal $P_{MOD}$; and determining a power correction factor for the optical channel by determining the difference between the optical power of the unmodulated optical carrier signal and the optical power of the modulated optical carrier signal.

7. A network element of a wavelength division multiplexed communications network, the network element comprising:

an optical source operable to generate an optical carrier signal for an optical channel;

optical power measurement apparatus arranged to receive a portion of the optical carrier signal and to determine the optical power of the optical signal; and control apparatus operable to:

i. receive from the optical signal power measurement apparatus an optical power measurement ($P_{HIGH}$) of an unmodulated optical carrier signal received from the optical source;

ii. receive from the optical signal power measurement apparatus an optical power measurement ($P_{MOD}$) for a modulated optical carrier signal received from the optical source; and iii. determine a power correction factor for the optical channel by determining the difference between the received optical power of the unmodulated optical carrier signal and the received optical power of the modulated optical carrier signal.

8. The network element as claimed in claim 7, wherein the control apparatus is further operable prior to step i. to generate a first control signal arranged to cause the optical source to generate an unmodulated optical carrier signal and is further operable prior to step ii. to generate a second control signal arranged to cause the optical source to apply a test modulation pattern to the optical carrier signal, to thereby form a modulated optical carrier signal.

9. The network element as claimed in claim 8, wherein the control apparatus is further operable to obtain a desired optical power value for the optical channel and to determine an operational power value for the optical channel equal to the desired optical power value plus the power correction factor, and to configure the optical source to generate an optical carrier signal having an optical power substantially equal to the operational power value.

10. A channel monitoring unit for a wavelength division multiplexed communications network, the channel monitoring unit comprising:

optical power measurement apparatus arranged to receive a portion of an optical carrier signal from an optical source of an optical channel of the network and to determine the optical power of the optical carrier signal; and a processor unit operable to:

i. receive from the optical signal power measurement apparatus an optical power measurement ($P_{HIGH}$) of an unmodulated optical carrier signal received from the optical source;

ii. receive from the optical signal power measurement apparatus an optical power measurement ($P_{MOD}$) for a modulated optical carrier signal received from the optical source; and iii. determine a power correction factor for the optical channel by determining the difference between the received optical power of the unmodulated optical carrier signal and the received optical power of the modulated optical carrier signal.

11. The channel monitoring unit as claimed in claim 10, wherein the processor unit is further operable prior to step i. to generate a first control signal to cause the optical source generate an unmodulated optical carrier signal and is further operable prior to step ii. to generate a second control signal to cause the optical source to apply a test modulation pattern to the optical carrier signal, to thereby form a modulated optical carrier signal.

12. A non-transitory data carrier having computer readable instructions embodied therein for providing access to resources available on a processor, the computer readable instructions comprising instructions to cause the processor to perform the steps of a method of determining a power correction factor for an optical power of an optical channel of a wavelength division multiplexed communications network, the method comprising:

configuring an optical source of the communications network to generate an unmodulated optical carrier signal for the optical channel;

determining the optical power of the unmodulated optical carrier signal $P_{HIGH}$;

configuring the optical source to apply a test modulation pattern to the optical carrier signal to thereby generate a modulated optical carrier signal for the optical channel;

determining the optical power of the modulated optical carrier signal $P_{MOD}$; and determining a power correction factor for the optical channel by determining the difference between the optical power of the unmodulated optical carrier signal and the optical power of the modulated optical carrier signal.

* * * * *

UNITED STATES PATENT AND TRADEMARK OFFICE
CERTIFICATE OF CORRECTION

| | | |
|---|---|---|
| PATENT NO. | : 8,798,464 B2 | Page 1 of 1 |
| APPLICATION NO. | : 13/256935 | |
| DATED | : August 5, 2014 | |
| INVENTOR(S) | : Bruno et al. | |

It is certified that error appears in the above-identified patent and that said Letters Patent is hereby corrected as shown below:

In the Specification,

In Column 2, Line 24, delete "rather then" and insert -- rather than --, therefor.

In Column 10, Line 34, delete "amplifier 98" and insert -- amplifier 92 --, therefor.

Signed and Sealed this
Twenty-eighth Day of July, 2015

Michelle K. Lee
*Director of the United States Patent and Trademark Office*